United States Patent [19]

Padgett

[11] Patent Number: 4,850,308
[45] Date of Patent: Jul. 25, 1989

[54] ANIMAL HANDLING APPARATUS

[75] Inventor: Barry C. Padgett, Exeter, Australia

[73] Assignee: Trax Pty. Ltd., Launceston, Australia

[21] Appl. No.: 62,693

[22] Filed: Jun. 16, 1987

[51] Int. Cl.$^4$ ............................................. A01K 29/00
[52] U.S. Cl. ..................................... 119/82; 119/103; 119/155
[58] Field of Search .............. 119/82, 103, 155, 14.04; 17/97 R, 11, 11.2

[56] References Cited

U.S. PATENT DOCUMENTS

| 54,023 | 4/1866 | Sage | 119/103 |
|---|---|---|---|
| 1,105,004 | 7/1914 | Smith | 119/82 |
| 1,587,348 | 6/1926 | Myers | 119/82 |
| 2,744,615 | 5/1956 | Ronk | 119/82 |
| 2,861,292 | 11/1958 | Powers | 17/11 |

FOREIGN PATENT DOCUMENTS

| 594936 | 2/1978 | U.S.S.R. | 119/103 |
|---|---|---|---|
| 2054337 | 2/1981 | United Kingdom | 119/103 |

Primary Examiner—Robert Peshock
Attorney, Agent, or Firm—Burns, Doane, Swecker & Mathis

[57] ABSTRACT

Animal handling apparatus in the form of a closed track around which a number of carriages may run. Each carriage has a cradle for supporting an animal on its back, the cradle portion being rotatable relative to the remainder of the carriage. A catching box turns a sheep on its side and down a ramp onto a cradle on its back and a hook connected to an air pump catches and decelerates a moving carriage to deposit a treated sheep back on its feet.

26 Claims, 7 Drawing Sheets

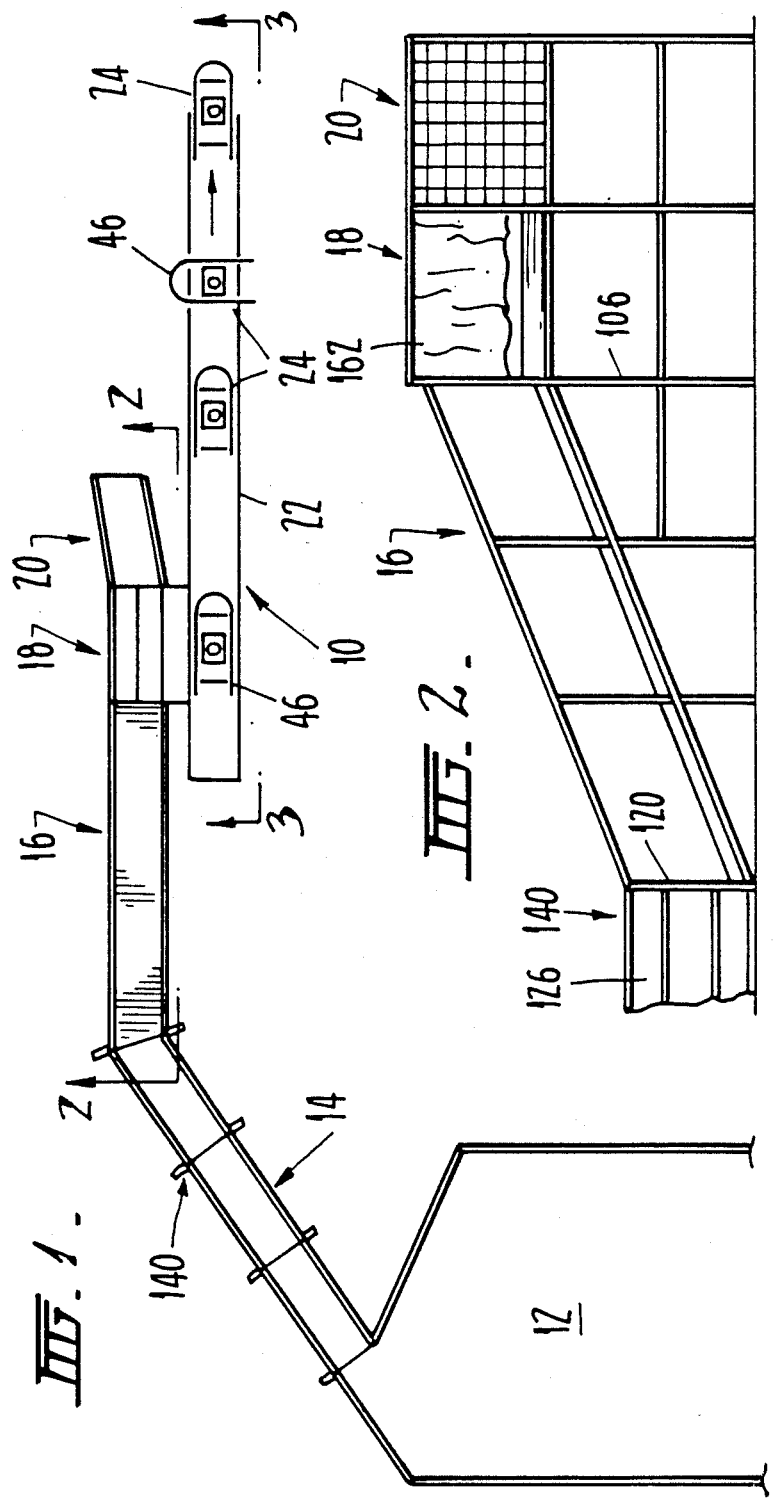

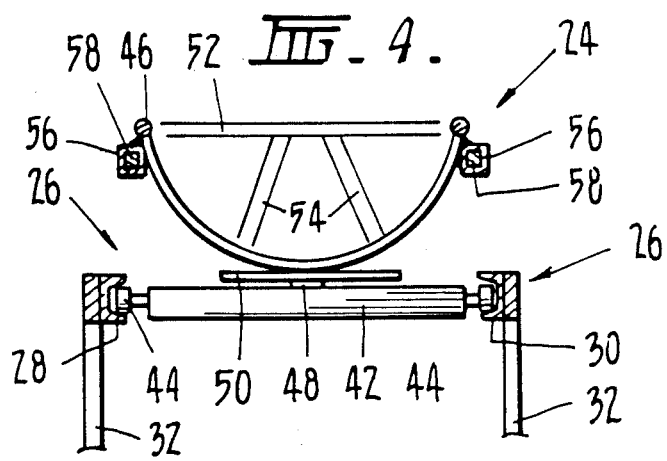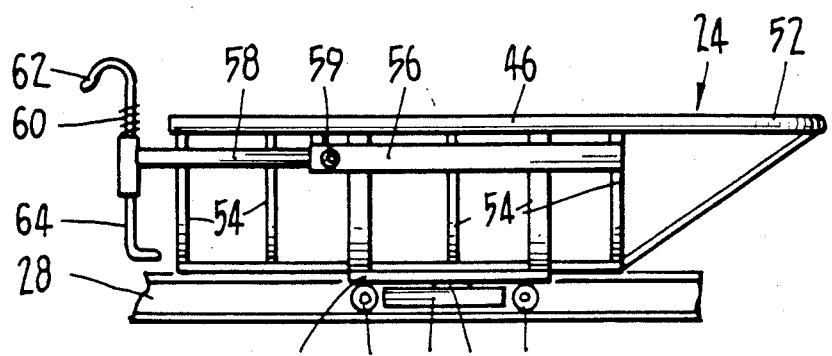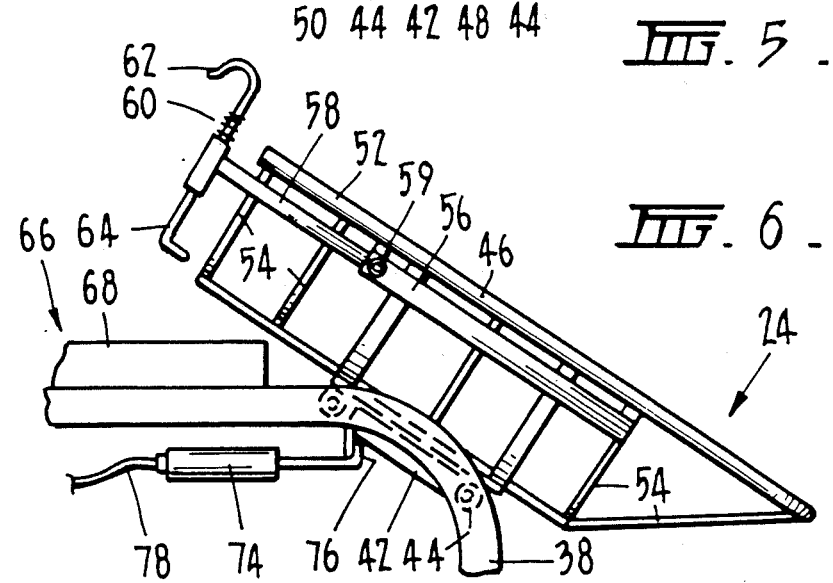

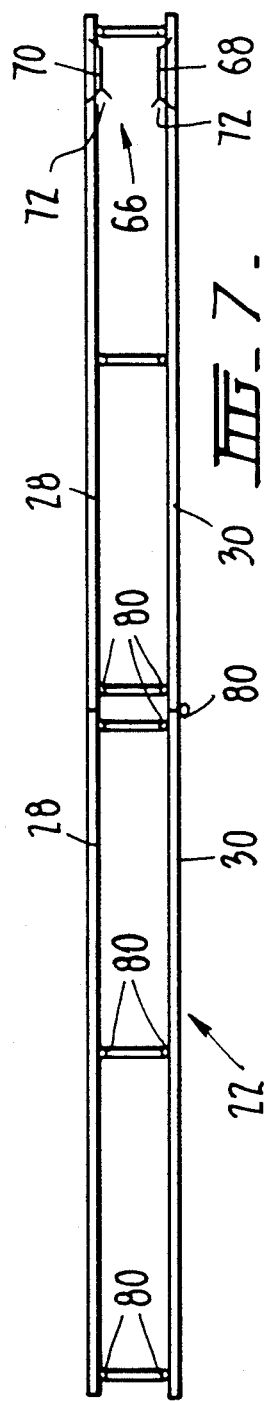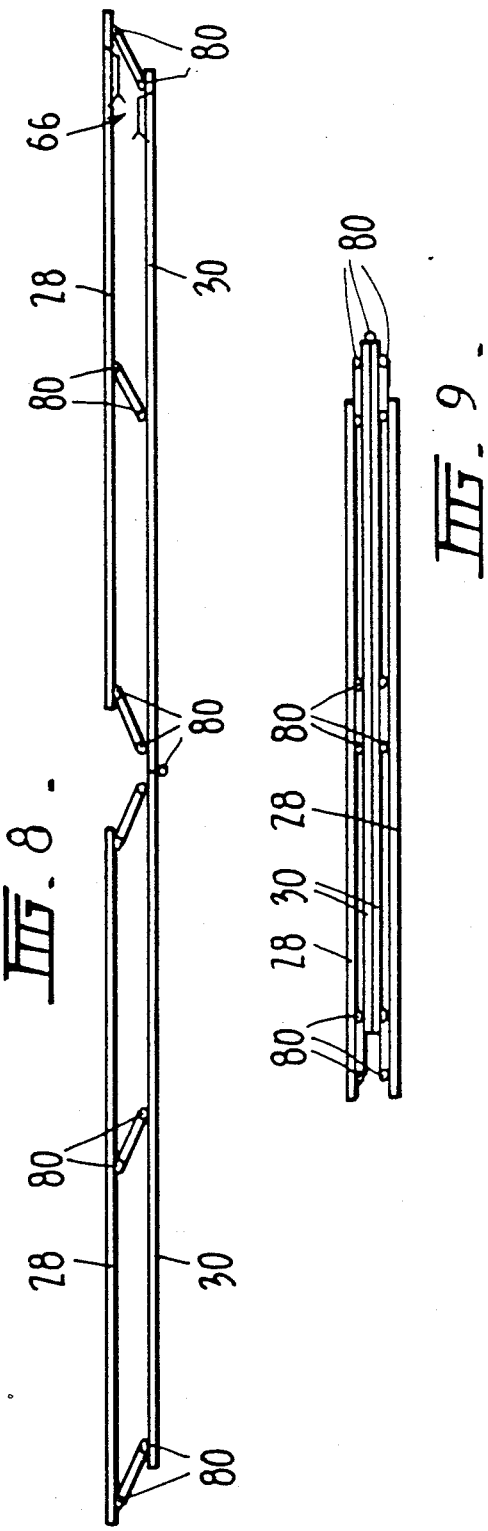

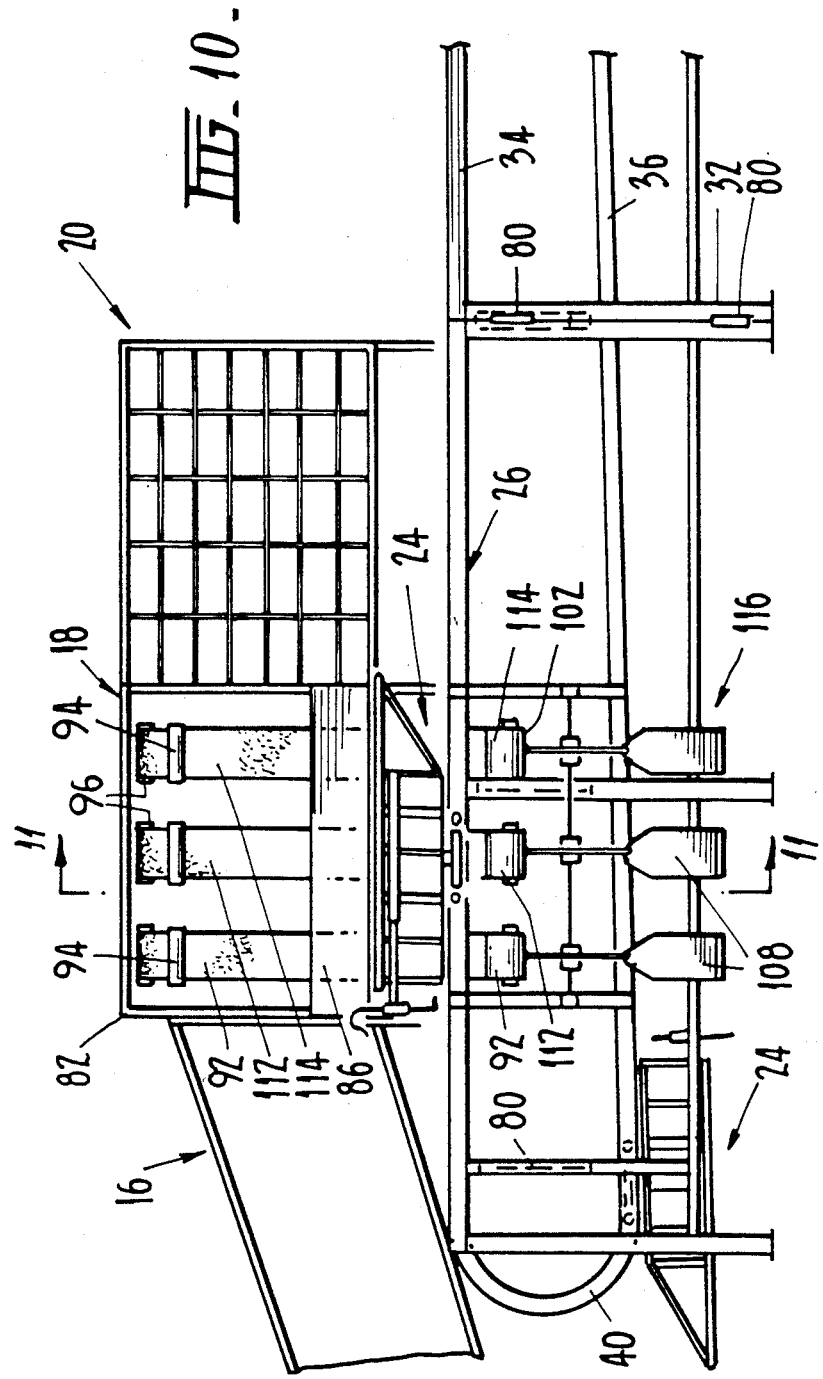

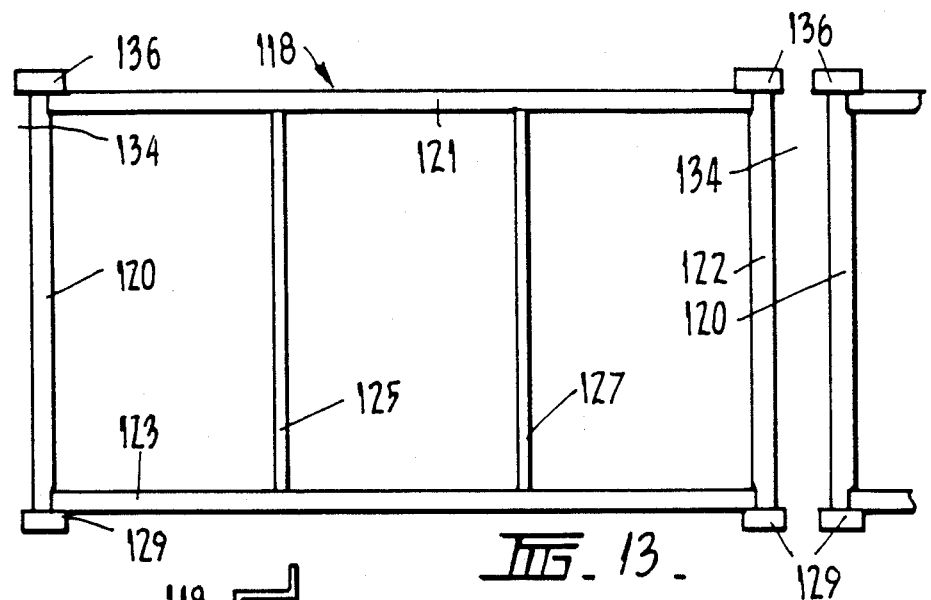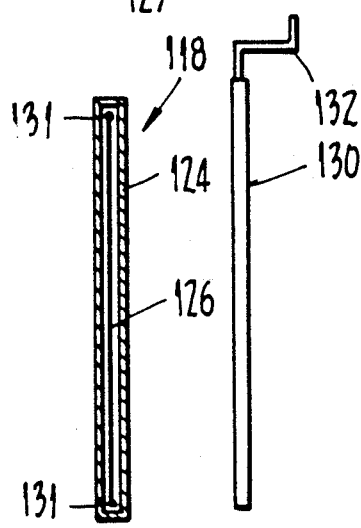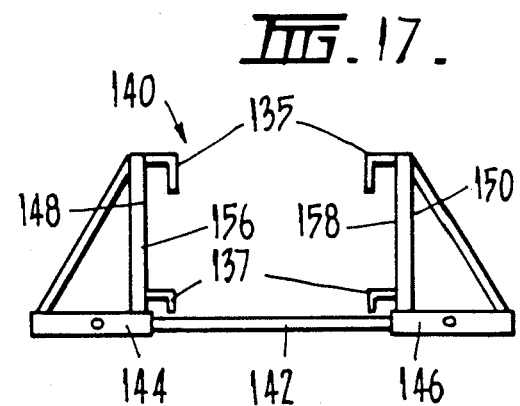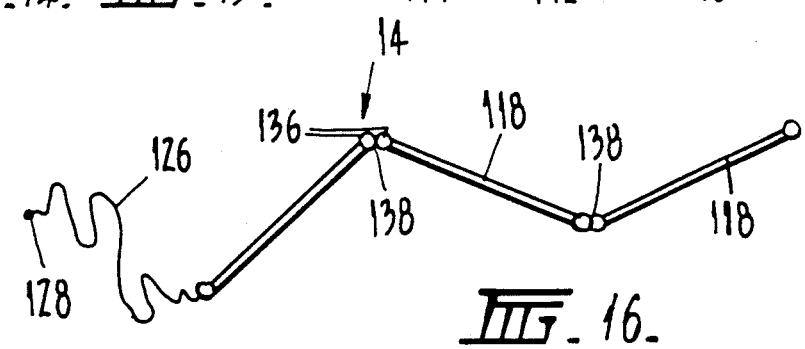

4,850,308

ANIMAL HANDLING APPARATUS

BACKGROUND OF THE INVENTION

1. Field of the Invention

This invention relates to apparatus for handling animals, and is particularly applicable to the handling of sheep.

2. Description of the Prior Art

It is necessary to periodically perform operations on sheep in order to maintain a healthy flock, or to harvest wool therefrom. There has long been a need for a more automated manner of carrying out drenching, crutching, mulesing, marking and other operations which are desirably carried out at one time.

Various arrangements for handling sheep in this general manner have been used, but they suffer from many disadvantages, including being too complicated in construction and operation, being generally unsatisfactory, and being less than easily portable.

SUMMARY OF THE INVENTION

It is an object of this invention to provide improved animal handling apparatus.

The invention provides animal handling apparatus including a track on which at least one carriage may be mounted for movement between stations along said track, said or each carriage including an animal-receiving portion.

The invention also provides apparatus for locating an animal, including means to move an animal in an upright position laterally to pivot it about approximately 180°, without gripping the animal in any way.

The invention further provides a barrier for use in restraining or channeling the movement of animals, including a plurality of substantially rigid panels, and flexible sheet-like material adapted to pass through at least a part of each said panel. FIG. 1 is a plan view of the components of one embodiment of sheep handling apparatus according to the invention;

FIG. 2 is a side elevation of part of the apparatus in the direction of arrows 2—2 of FIG. 1;

FIG. 4 is a diagrammatic cross-section along the lines 4—4 of FIG. 3;

FIG. 5 is a side elevation of a sheep carriage in place on a portion of track;

FIG. 6 is a side elevation of a sheep carriage in the sheep discharging position;

FIG. 7 is a plan view of the track portion of the apparatus of FIG. 3;

FIG. 8 is a plan view of the track portion of FIG. 7, shown partially folded;

FIG. 9 is another plan view of the track portion of FIG. 7, fully folded;

FIG. 10 is a front elevation of sheep catching box.

FIG. 13 is a front elevation of a panel for a folding race;

FIG. 14 is an end elevation of the panel of FIG. 13;

FIG. 15 is an end elevation of a tightening fork; FIG. 16 is a plan view of linked panels; and FIG. 17 is a side elevation of a race support structure.

DETAILED DESCRIPTION OF THE PREFERRED EMBODIMENT

Figure 3:
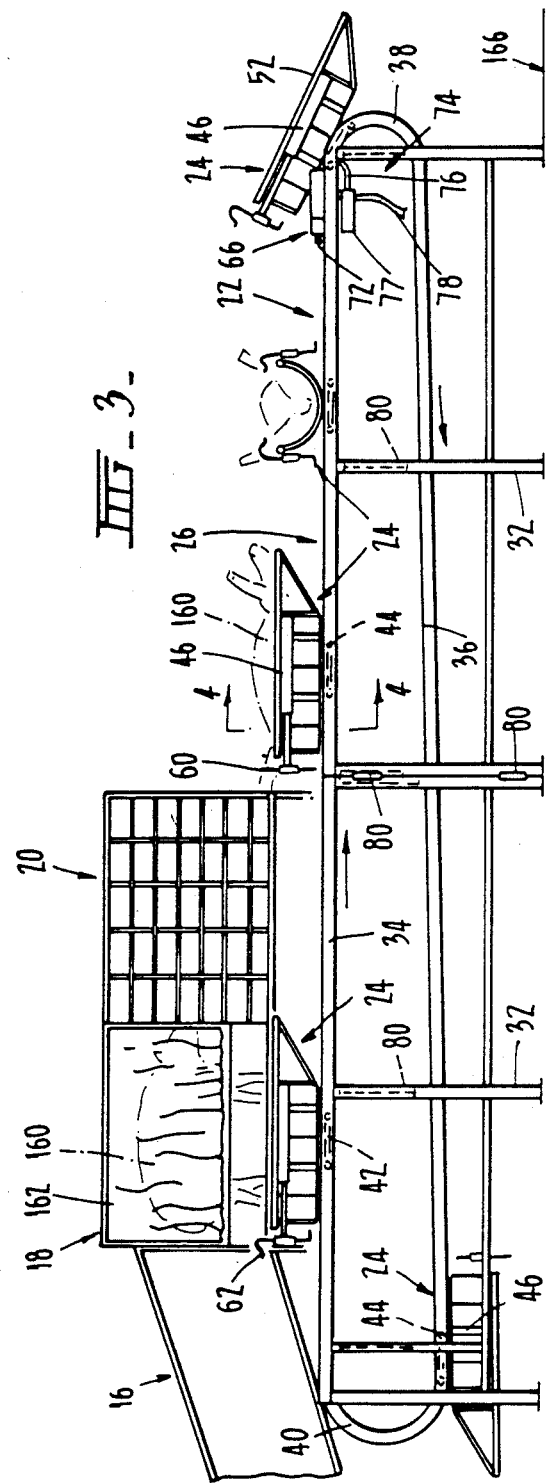
FIG. 3 is a side elevation of the track and carriage elements of the apparatus in the direction of arrows 3—3 of FIG. 1.

Referring firstly to FIGS. 1 and 2, the animal handling apparatus 10 is described in the preferred mode that of dealing with sheep, and includes a sheep catching pen 12 (which may be conventional), a race 14 leading therefrom, a folding race suitable there for being described hereinafter in relation to FIGS. 13 to 17, a ramp 16 leading upwards from ground level, a sheep catching box 18, a decoy pen 20, and a 'sheep train' 22. The train 22 can accommodate a number of carriages 24.

Turning now to FIGS. 3 to 9, these figures show elements of the 'sheep train' 22. The train 22 consists of an endless track 26, which as seen in FIG. 4 consists of two rails 28, 30 of U-shaped configuration, arranged with the open ends of the 'U' facing each other. The track is supported from the ground and the separation of the rails 28, 30 is effected by a frame 32, which will be described in somewhat more detail hereinafter with reference to FIGS. 7 to 9.

As can be seen in FIG. 3, the track 26 includes a generally horizontal section 34, a sloping lower portion 36, and curved end portions 38, 40.

A sheep carriage 24 is shown in more detail in FIGS. 4 and 5. The carriage includes a base 42 having four wheels 44 arranged to operate as a railway bogie. The cradle 46 is pivotally connected to base 42 at 48. Preferably, the cradle 46 can turn through 360°, and preferably it may be so arranged that it can be located relatively fixedly at predetermined angular positions, such as parallel to the track 26 or at right angles thereto. The cradle consist of a main portion 50 supporting an upper cradle member 52, which in turn supports the other sheepretaining elements 54 of the cradle, which elements may be steel plate, steel mesh, nylon netting or the like. The main portion 50 also has bars 56 attached thereto, on either side of the cradle, the bars preferably being a telescoping arrangement with a moveable member 58, which can be secured by a nut or the like 59 in any desired position. Each member 58 carries a hock bar 60 which has a hock-engaging portion 62 at its upper end and an actuating portion 64 at its lower end. The bar 60 is adapted to rotate about its main axis, relative to member 58.

Any number of carriages 24 may be located on track 26, for movement around the closed loop of the track. The direction of travel is as shown by the arrows in FIG. 1 and 3. At end 38, there is located an automatic hock bar (60) tripping mechanism (FIG. 7), which consists of two plates 68, 70 located opposite each other, each having a hook-like member 72 protruding therefrom. Located between rails 28, 30 is a carriage arresting device 74 consisting of a spring-loaded hook 76 which is adapted to catch on part of a carriage 24 in order to slow it at the position shown in FIG. 5. The hook 76 is connected to an air pump 77 which operates upon each extension due to contact with a carriage 24, thereby acting as a shock absorber. The pumped air is passed along tube 78 to pressurized container (not shown) from which the air under pressure can be used, for example, for spraying fluids such as scanning oil as part of sheep treatment. Each carriage may automatically disengage from hook 76 at a particular point, or hook 76 may be manually disengaged.

The track 22 may be folded for transportation as shown in FIGS. 7, 8 and 9. Frame 32 may be hinged at various points 80, and may be held in an assembled position by pins. When the pins are removed (FIG. 8) the train can be collapsed, and can also be folded in half (FIG. 9). Of course, other ways of hinging the train may be used; a greater length thereof may require more hinging points.

Although the operation of the sheep train 22 will be described in detail hereinafter, it will suffice to say here that it is intended that a raised platform be located next to the track 26, in order for a person to carry out certain tasks in relation to the sheep. In addition, an additional feature, a wool removing tray (not shown) may be provided at one side of the top level of track 22. The tray would receive wool removed as part of a crutching or shearing operation. Carriages 24 would be fitted with 'sweepers' extending laterally therefrom, to push the wool on the tray to a chute at the end thereof, down which the wool would then travel to a container.

Figure 11:
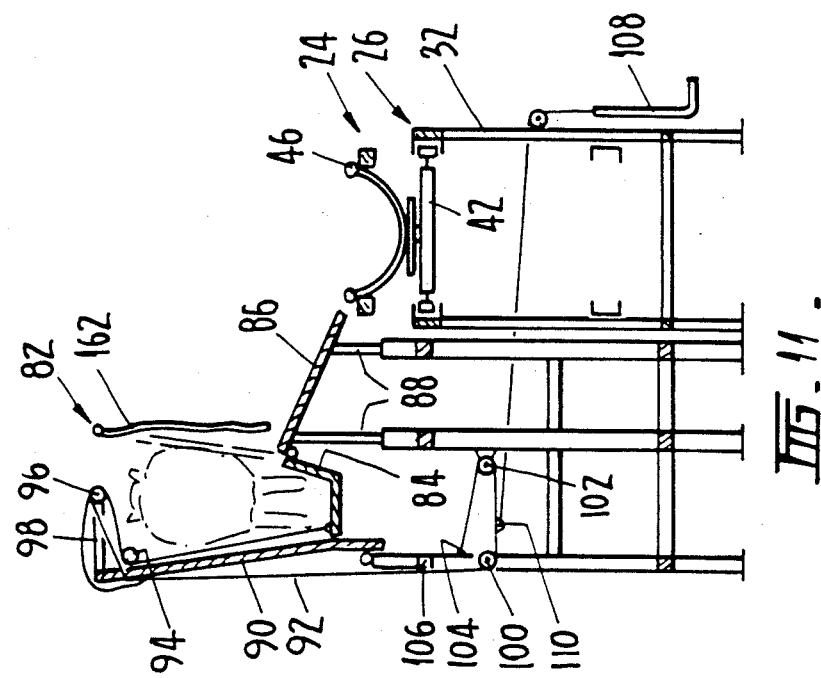
FIG. 11 is a cross-section along the lines 11—11 of FIG. 10.
Figure 12:
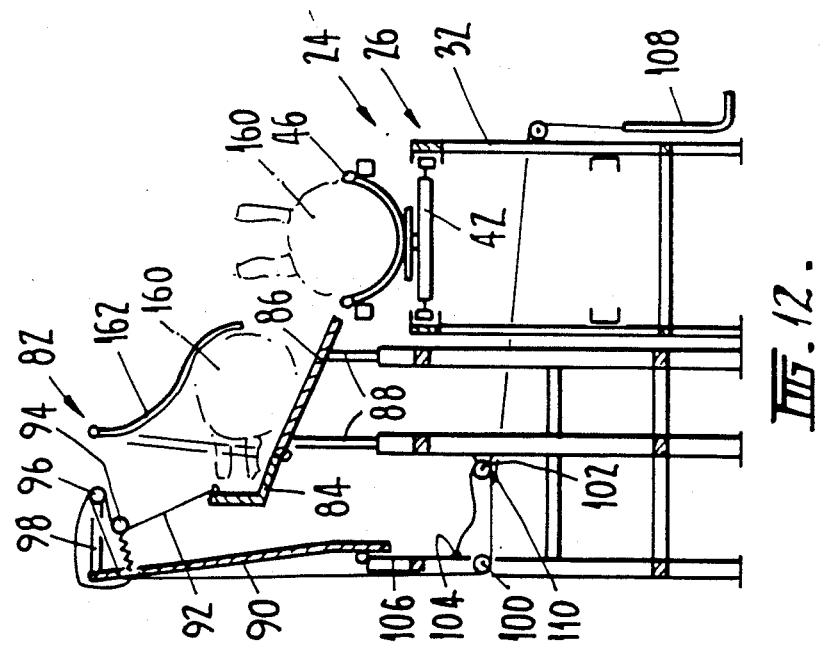
FIG. 12 is a cross-section along the lines 12—12 of FIG. 10.

FIGS. 10 to 12 show a catching box 82 for locating a sheep in a cradle 46. A sheep enters the box 82 from ramp 16, and is shut in the box. The box includes a narrow section of floor, and a trip bar 84 and ramp 86 which leads in use to a carriage 24 located in front of box 82. The trip bar 84 and ramp 86 are height adjustable as shown at 88, to cater for different sizes of sheep. The box 82 has a hinged back 90, to again allow for some adjustment in accordance with sheep size. Trip bar 84 is pivoted to ramp 86. One end of trip 84 is attached to belt 92 (which may be formed from seat belt webbing or other suitable material), which passes over spring-loaded roller 94, roller 96 (which extends out from back 90 on arm 98), around back 90, over rollers 100, 102 to a point 104 where its other end is attached to frame 106. Foot pedal 108 is connected to belt 92 at 110, so that operation thereof will tighten belt 92. As shown in FIG. 10, three belts (and associated equipment) 92, 112, 114 may be used. Controls 116 could be used (FIG. 13) so that operation of one, two or all three belts could be selected. The mechanism for operating the belts could be an hydraulic mechanism, an air-operated mechanism, or any other suitable mechanism, and alternatives to foot pedal control, such as handles or the like, could be used. A curtain 162 may be placed across the front of box 18, so that the sheep cannot see out.

FIGS. 13 to 17 show a folding race or barrier arrangement. The race or barrier includes a plurality of panels 118 (FIG. 13) the posts 120, 122 of which have aperture 124 therethrough, through which a sheet of suitable fabric or material 126, (for example, formed from PVC) can be threaded, through a succession of frames 118 to join them together. One end of the material 126 may be provided with a stop device 128 (FIG. 16) such as a rope sewn therein, to prevent the material being drawn through the panels 118. At the other end a fork device 130 with an integral handle 132 can be placed over the material. The handle 132 can then be rotated to wind the material onto the fork, to tighten the race arrangement 14.

Each panel 118 has, apart from posts 120, 122 top and bottom members 121, 123 respectively, and pairs of vertical members 125, 127 which act to prevent billowing of the sheet 126.

Posts 120, 122 are provided top and bottom with cylindrical members 136, 129 which act to provide contact surfaces for adjacent panels 118. The other surfaces of members 136, 129 are at least roughened, and may be in the form of gear wheels, to enable meshing of contacting members. This tends to prevent adjacent panels 118, having been placed at an angle to each other, forming corners 138 (FIG. 16) straightening out under the influence of the tension in material 126. An alternative connection means for adjacent panels 118 is a rope secured to one end and a cam cleat at the other.

Panels 118 may be provided with anti-backing devices (in the nature of spring loaded bars or the like) which allow movement of animals in one direction only, when panel 118 are being used as a race.

Sheet 126 has a rope 131 top and bottom (FIG. 14), sewn into the sheet or otherwise secured thereto.

FIG. 17 shows a frame 140 capable or being used as a brace for the race 14. The frame 140 includes a base member 142 which is slidably received within lower members 144, 146 of triangular structures 148, 150 respectively. Wing nuts, grub screws or the like 152, 154 hold the structures 148, 150 in place on member 142 at desired locations. The frame is attached to the race 14, by being hooked on to panels 118. Upper hooks 135 are adapted to be hooked onto members 121, and lower hooks 137 are adapted to be hooked over lower members 123, trapping the members between hooks 137 and member 142, which may be staked to the ground. Alternatively the upright members 156, 158 could be hollow like posts 120, 122 of panel 48, and the material 126 could pass through those members also. Alternatively, the frames 140 could be dispensed with and the parallel race side could be attached so that they were braced, for example by connecting opposed panels 118. When not in use, the race 14 could be folded up, with the panels 118 stacked, the cloth/PVC material acting as a hinge.

The sheep handling apparatus 10 operates as follows.

Sheep are placed in pen 12 in a conventional manner. They are led from pen 12 along race 14, which has been erected conventionally, or as described hereinbefore. The sheep are individually led up ramp 16 to catching box 18. A sheep is normally kept in decoy pen 20 to attract and/or reassure a sheep being led into catching box 18.

The catching box 18 operates to position a sheep 160 on its back in a cradle 46. When the sheep is in the box, and a carriage 24 positioned opposite the front thereof, the operator operates the appropriate control; if the sheep is forward in the box, the operator may only operate belt 114. If the sheep 160 is centrally located, belt 112, belts 92 and 114, or all three belts may be operated. With operation, the selected belt is tightened, between pulley 96 and the connection point between the belt and trip bar 84. This exerts pressure on the flank of sheep 160. Ultimately, the sheep is tipped over by the belt-tightening, overbalancing because its legs abut the top of ramp 86. The sheep slides on its side down ramp 86 and lands in cradle 46. Spring-loaded pulley 94 is attached to a spring 164, which draws the pulley to the back 90 of the box when the controls are released.

The carriage 24 will have been positioned such that the head of the sheep 160 will be on the right in the view of FIG. 5. Hock bars 60 will be turned inwards, so that the sheep's legs can be located in portion 62. It is well known that sheep are docile in such a position, and it is now only necessary to move carriage 24 along track 26, carrying out the desired operation or operations, sequentially if desired, in a 'production line' system. At the catching box 18, a further carriage will be positioned, and a further sheep led in and processed.

It should be mentioned here that sheep may be shorn whilst in the cradle 46. The sides of cradle 46 could be hinged so that they open outwards. A mechanism could be provided which would allow the nearside (or farside) of the cradle to drop away, to give access to one flank of the sheep for shearing. After the one side of the sheep has been shorn, the side could be pivoted back into place, the cradle 46 rotated through 180°, the now nearside, dropped, and the other flank of the animal shorn. The rest of the animal could be shorn while it lies on its back. Many specific ways of pivoting parts of cradle 46 for shearing could be carried out.

When an individual sheep has been completely processed, its carriage 24 will be sent in the direction of the top arrow in FIG. 3 towards end 38, for liberation of the animal at area 166. There are inbuilt safeguards to prevent injury to the animal. The first, tripping mechanism 66, operates to catch actuating portions 64 with plates 68, 70 to turn them through 90°(this being guaranteed by passing portions 64 between members 72 and the respective plates 68, 70 to ensure the 90° orientation) to free the legs of the sheep. Secondly, carriage 24 is stopped at the position shown in FIG. 6, by arresting device 74 operating to engage hook 76 with a portion of the base 42 of cradle 46. Acting as a shock absorber, the hook 76 will gently cause the carriage 24 to decelerate.

The sheep will fall gently away to its feet on area 166. The carriage 24 will then automatically disengage; or when the operator sees the sheep released, or sees the empty cradle, he will manually disengage the hook 76 which will allow carriage 24 to roll over end 38 and down section 36 in the direction of the lower arrow in FIG. 3, so that it comes to rest at end 40, ready to be pulled around end 40 to again be located at the front of catching box 18.

It can be seen that this invention is a clear improvement over previous animal handling apparatus. Clearly, with modifications, the embodiment could be used for handling other types of animals.

What I claim is:

1. An animal handling apparatus comprising:
    a track in the form of a closed loop;
    at least one carriage mountable on said track for movement around said track;
    more than one work station located along said track; and
    said carriage including an animal-handling portion;
    wherein said at least one carriage is moveable around said track between said work stations relatively independently of other carriages that may be mounted on said track.

2. An animal handling apparatus according to claim 1, wherein said at least one carriage is mounted on said track by a plurality of wheels.

3. An animal handling apparatus according to claim 1, wherein said loop is arranged in a substantially vertical plane.

4. An animal handling apparatus according to claim 3, wherein said loop includes an upper, generally horizontal portion, a lower, generally sloping portion, and two curved portions, connecting respective ends of said upper and lower portions to form said loop.

5. An animal handling apparatus according to claim 1, wherein said carriage has a rotatable animal cradle thereon, forming said animal-receiving portion.

6. An animal handling apparatus according to claim 4 including deceleration means located in the vicinity of the junction between said upper portion and a curved portion of said track, said deceleration means being adapted to cause the safe ejection of an animal from said cradle.

7. An animal handling apparatus according to claim 1, wherein said track is foldable.

8. An animal handling apparatus according to claim 1, further including animal tipping means adapted to tip an animal from a standing position into a supine position on said animal-receiving portion, said animal tipping means being located adjacent said track and including a catching box in which the animal may be confined in a standing position, a trip bar located on the track side of said box and extending generally parallel to said track said trip bar being located at a height to place it level with the legs of the animal, at least one belt, a portion of which is adapted to be moved to enfold the body of the animal and urge the body towards said track until the animal overbalances sideways over said trip bar, and a ramp which allows a fallen animal to slide onto said animal-receiving portion of a carriage in a supine position.

9. An animal handling apparatus according to claim 8, wherein a foldable race is used to introduce sheep to said animal tipping means.

10. An animal handling apparatus according to claim 9, wherein said foldable race is formed from barriers, each said barrier including a plurality of substantially rigid panels formed from panel elements, including end elements, at least said end elements each being provided with an aperture extending substantially the entire height thereof, through which flexible sheet-like material may be passed to form a sheet wall in each panel, the sheet-like material extending from one said panel to another to form a hinge therebetween.

11. An animal handling apparatus according to claim 6, wherein said deceleration means is a hook attached to an air pump, said hook being adapted to engage a carriage, the continued movement of said carriage causing said pump to pump air to air storage means, in reaction to which the carriage is decelerated.

12. An animal handling apparatus according to claim 11, wherein the deceleration occurs as said carriage commences to move around one curved portion of track, thereby allowing an animal thereon to fall under the influence of gravity to land on its feet on the ground.

13. An animal handling apparatus according to claim 1, including a hock bar located on either side of said carriage near the rear thereof, in relation to the direction of travel around said track, each hock bar being adapted to be moved to a first position in which it will engage a respective hock of an animal, and hock bar releasing means located on each side of said track, each said hock bar releasing means operating to engage a respective hock bar, as said carriage moves along said track, to move each said hock bar to a second position where it does not engage a respective hock.

14. An animal handling apparatus comprising:
    a track in the form of a closed loop;
    a plurality of work stations located along said track; and
    at least one carriage mountable to said track having an animal receiving portion for transporting animals between said stations on said track;

wherein said at least one carriage is moveable around said track relatively independently of other carriages that may be mounted on said track.

15. An animal handling apparatus according to claim 14, wherein said carriage is mounted on said track by a plurality of wheels.

16. An animal holding apparatus according to claim 14 wherein:
said track is arranged in a substantially vertical plane.

17. An animal holding apparatus according to claim 16, wherein:
said track includes an upper generally horizontal portion, a lower generally sloping portion, and two curved portions connecting respective ends of said upper and lower portions to form said closed loop.

18. An animal holding apparatus according to claim 14 wherein said at least one carriage includes a cradle rotatable in a plane perpendicular to the plane of said closed loop.

19. An animal holding apparatus according to claim 17 further comprising:
deceleration means for decelerating said carriage to safely eject an animal therefrom, said deceleration means being located near a junction between said upper portion and a curved portion of said track.

20. An animal holding apparatus according to claim 14 wherein said track is foldable.

21. An animal holding apparatus according to claim 14 further comprising:
animal tipping means for tipping an animal from a standing position to a supine position on said animal receiving portion, said animal tipping means being located adjacent said track;
said tipping means including a catcher box in which the animal may be confined in a standing position, a tip bar located on the track side of said box extending substantially parallel to said track, and at a height level with the legs of the animal, at least one belt, a portion of which is movable to enfold the body of the animal and push the animal towards the track until the animal over balances sideways over said tip bar; and a ramp whereby said tipped animal slides onto said animal receiving portion of said carriage in a supine position.

22. An animal holding apparatus according to claim 21 further comprising;
a foldable race for guiding an animal into said animal tipping means.

23. An animal holding apparatus according to claim 22 wherein:
said foldable race is formed from a plurality of barriers, said barriers being comprised of a plurality of substantially rigid panels to form panel elements including end elements;
at least said end elements are substantially hollow through which a flexible sheet like material may be passed; and
said sheet like material extending from one panel to another to form a hinge therebetween.

24. An animal holding apparatus according to claim 19 wherein;
said deceleration means includes a hook attached to an air pump, said hook engageable with said carriage whereby the continued movement of said carriage causes said pump to pump air into an air storage means and thereby decelerate said carriage.

25. An animal holding apparatus according to claim 24 wherein;
said deceleration means is positioned to commence deceleration as said carriage moves around one of said curved portions of said track, thereby allowing an animal to drop to the ground on its feet under the influence of gravity.

26. An animal holding apparatus according to claim 14 wherein said carriage further comprises;
a hock bar located on either side of said carriage near the rear thereof in relation to the direction of travel of said carriage, said hock bar movable to a first position to engage a hock of an animal; and
a hock bar releasing means located on each side of said track for engaging said hock bar to move said hock bar to a second position where it does not engage a hock and an animal.

* * * * *